(12) United States Patent
Chowdhury et al.

(10) Patent No.: US 9,319,757 B2
(45) Date of Patent: Apr. 19, 2016

(54) OPTICAL WAVELENGTH-SELECTIVE SWITCH WITH A BANK OF WAVELENGTH CONVERTORS

(71) Applicants: Aref Chowdhury, Berkeley Heights, NJ (US); Dominick Scordo, Leonardo, NJ (US)

(72) Inventors: Aref Chowdhury, Berkeley Heights, NJ (US); Dominick Scordo, Leonardo, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 13/726,382

(22) Filed: Dec. 24, 2012

(65) Prior Publication Data

US 2014/0177658 A1 Jun. 26, 2014

(51) Int. Cl.
*H04Q 11/00* (2006.01)
*H04J 14/02* (2006.01)

(52) U.S. Cl.
CPC ........ *H04Q 11/0005* (2013.01); *H04J 14/0212* (2013.01); *H04Q 2011/003* (2013.01); *H04Q 2011/0011* (2013.01); *H04Q 2011/0016* (2013.01); *H04Q 2011/0058* (2013.01)

(58) Field of Classification Search
USPC ............ 370/535, 542; 398/16, 25, 28, 31, 48, 398/63, 151, 168
See application file for complete search history.

(56) References Cited

U.S. PATENT DOCUMENTS

| | | | |
|---|---|---|---|
| 2002/0048067 A1* | 4/2002 | Handelman et al. | 359/139 |
| 2002/0122241 A1* | 9/2002 | LoCascio et al. | 359/332 |
| 2002/0159688 A1* | 10/2002 | Kim et al. | 385/24 |
| 2003/0133641 A1* | 7/2003 | Yoo | 385/14 |
| 2006/0072872 A1* | 4/2006 | Mitamura | 385/18 |
| 2008/0205821 A1* | 8/2008 | McGuire | 385/17 |
| 2009/0232446 A1* | 9/2009 | Nagy et al. | 385/18 |
| 2011/0103739 A1* | 5/2011 | Nishizawa et al. | 385/18 |
| 2014/0177658 A1* | 6/2014 | Chowdhury et al. | 370/542 |

FOREIGN PATENT DOCUMENTS

| | | |
|---|---|---|
| JP | 2009-33543 A | 2/2009 |
| JP | 2010-103640 A | 5/2010 |

OTHER PUBLICATIONS

You, S., "Performance improvement of bandwidth-flexible reconfigurable optical add/drop multiplexers with wavelength converters", Optical Transmission Systems, Subsystems, and Technologies IX, Bellingham, WA, Proceedings of SPIE-OSA-IEEE, vol. 8309, No. 1, Nov. 30, 2011, pp. 83092S-1-83092S-7.
Goto, Nobuo, et al., "Wavelength-Multiplexed Optical Switching System Using Acousto-Optic Switches", IEEE/IEICE Global Telecommunications Conference 1987, Conference Record vol. 2 of 3, Nov. 15-18, 1987, Tokyo, Japan, pp. 1305-1309.
PCT International Search Report, PCT/2013/073295, Intn'l Filing Date Dec. 5, 2013, Mailing date of Search Report Feb. 19, 2014.
Abstract of JP 2010103640, May 6, 2010, Nippon Telegraph & Telephone, (Published by European Patent Office ) 1 page.
Abstract of JP 2009033543, Feb. 12, 2009, Nippon Telegraph & Telephone, (Published by European Patent Office) 1 page.

* cited by examiner

*Primary Examiner* — Benjamin H Elliott, IV
(74) *Attorney, Agent, or Firm* — John F. McCabe (57) ABSTRACT

An apparatus includes a wavelength-selective optical switch able to route light between a first optical port and a plurality of second optical ports. The wavelength-selective optical switch includes a bank of optical wavelength-converters. Each wavelength converter of the bank is able to selectively optically couple an optical data stream on a wavelength-channel between the first optical port and individual ones of the second optical ports.

19 Claims, 5 Drawing Sheets

┌─ 52
│ OPTICALLY DE-MULTIPLEXING LIGHT INCIDENT ON AN OPTICAL
│ INPUT OF AN OWSS SUCH THAT THE INCIDENT LIGHT OF EACH OPTICAL
│ WAVELENGTH-CHANNEL OF A SEQUENCE IS DIRECTED TO A DIFFERENT
│ OPTICAL OUTPUT OF THE OWSS, THE DEMULTIPLEXING INCLUDING
│ WAVELENGTH-CONVERTING A FIRST PART AND A SECOND LATER PART
│ OF THE INCIDENT LIGHT IN THE SAME OPTICAL WAVELENGTH-
│ CONVERTER SUCH THAT THE WAVELENGTH-CONVERTED FIRST PART
│ IS SENT TO A DIFFERENT OPTICAL OUTPUT OF THE OWSS THAN
│ THE WAVELENGTH-CONVERTED SECOND LATER PART

┌─ 62
│ OPTICALLT MULTIPLEXING A PLURALITY OF OPTICAL DATA STREAMS
│ RECEIVED AT CORRESPONDING OPTICAL INPUTS OF AN OWSS, THE
│ MULTIPLEXING INCLUDING WAVELENGTH-CONVERTING SOME OF THE
│ RECEIVED OPTICAL DATA STREAMS IN OPTICAL WAVELENGTH-
│ CONVERTERS DURING A FIRST PERIOD AND A SUBSEQUENT SECOND
│ PERIOD, ONE OR MORE OF THE OPTICAL WAVELENGTH-CONVERTERS
│ OPERATING ON THE OPTICAL DATA STREAMS RECEIVED AT DIFFERENT
│ ONES OF THE OPTICAL INPUTS IN THE FIRST AND SECOND PERIODS

60

OPTICAL WAVELENGTH-SELECTIVE SWITCH WITH A BANK OF WAVELENGTH CONVERTORS

BACKGROUND

1. Technical Field

The inventions relate to optical wavelength-selective switches, systems using an optical wavelength-selective switch, and methods of operating such switches and systems.

2. Related Art

This section introduces aspects that may be helpful to facilitating a better understanding of the inventions. Accordingly, the statements of this section are to be read in this light and are not to be understood as admissions about what is in the prior art or what is not in the prior art.

A 1×N optical wavelength-selective switch (OWSS) is an optical switch that routes light received at a first optical port of the 1×N OWSS to N second optical ports of the 1×N OWSS based on the wavelength of the received light. If the light signal received at the first optical port of the 1×N OWSS includes light on multiple wavelength-channels, the 1×N OWSS may route light received on different ones of the wavelength-channels to different ones of the N second optical ports of the 1×N OWSS. A 1×N OWSS may be reconfigurable so that the routings of the various wavelength-channels of light received at the first optical port to the N second optical ports of the 1×N OWSS may have different mappings.

Some 1×N OWSSes may be operated in a reverse direction. In such a 1×N OWSS, light received at the N second optical ports of the 1×N OWSS can be wavelength-multiplexed by the 1×N OWSS into a light beam output at the first optical port of the 1×N OWSS.

A colorless 1×N OWSS is a 1×N OWSS configurable to transmit light on any wavelength-channel received at the first optical port of the 1×N OWSS to any of the N second optical ports of the 1×N OWSS. Here, the wavelength-channels are disjoint and belong to a preselected sequence for the 1×N OWSS.

SUMMARY

In some embodiments, an apparatus includes a wavelength-selective optical switch able to route light between a first optical port and a plurality of second optical ports. The wavelength-selective optical switch includes a bank of optical wavelength-converters. Each wavelength converter of the bank is able to selectively optically couple an optical data stream on a wavelength-channel between the first optical port and individual ones of the second optical ports.

In some embodiments of the apparatus, the wavelength-selective optical switch may further include an optical wavelength separator and an array of optical reflectors. The optical wavelength separator is configured to separate light received at the first optical port based on wavelength. Each optical reflector of the array is controllable to selectively redirect light received thereat from the optical wavelength separator to individual ones of the second optical ports and is controllable to selectively redirect light received thereat from the optical separator to individual ones of the optical wavelength-converters. In some embodiments, each optical reflector of the array may be controllable to redirect light received thereat to different ones of the optical wavelength-converters.

In any of the above embodiments, the wavelength-selective optical switch may include an array of optical reflectors, wherein each optical reflector of said array is able to redirect light between one of the optical wavelength-converters and individual ones of the second optical ports. In some such embodiments, each such optical reflector may be controllable to redirect wavelength-converted light from one of the optical wavelength-converters to a plurality of the second optical ports.

In any of the above embodiments, the above apparatus may include a reconfigurable optical add/drop multiplexer that includes the optical wavelength-selective switch. In some such embodiments, the optical wavelength-selective switch may be controllable to wavelength-convert light of some wavelength-channels that the reconfigurable optical add/drop multiplexer is able to drop from an optical transmission fiber optically connected thereto.

In any of the above embodiments, the above apparatus may include a reconfigurable optical add/drop multiplexer that includes the optical wavelength-selective switch. The optical wavelength-selective switch may be controllable to wavelength-convert light of some wavelength-channels that the reconfigurable optical add/drop multiplexer is able to add to an optical transmission fiber optically connected thereto.

In any of the above apparatus, the apparatus may further include a reconfigurable optical cross-connect for optically cross-connecting multiple optical transmission fibers. The reconfigurable optical cross-connect includes the optical wavelength-selective switch and is controllable to wavelength-convert some wavelength-channels that the reconfigurable optical cross-connect is able to optically cross-connect between the optical transmission fibers. Some such apparatus may also include a reconfigurable optical add/drop multiplexer that include a second optical wavelength-selective switch. In such apparatus, the second optical wavelength-selective switch is controllable to wavelength-convert some wavelength-channels that the reconfigurable optical add/drop multiplexer is able to add to or drop from one of the optical transmission fibers.

In some embodiments, a first method includes optically de-multiplexing light incident on an optical input of an optical wavelength-selective switch such that the incident light of each optical wavelength-channel of a sequence of non-overlapping optical wavelength channels is directed to a different optical output of the optical wavelength-selective switch. The optically de-multiplexing includes, in an optical wavelength-converter, wavelength-converting a first part of the incident light on one of the optical wavelength-channels and redirecting the wavelength-converted first part to a first of the optical outputs. The optically de-multiplexing includes, in the same optical wavelength-converter, subsequently wavelength-converting a second later part of the incident light on a different second of the optical wavelength-channels and redirecting the wavelength-converted second later part to a different one of the optical outputs.

In some embodiments of the first method, the optically de-multiplexing may include optically wavelength-converting a part of the light on the one of the wavelength-channels, in a separate second optical wavelength-converter, and redirecting the wavelength-converted second part to one of the optical outputs.

In any of the above embodiments, the first method may further include optically cross-connecting a portion of the light from a first optical transmission fiber to a second optical transmission fiber such that the cross-connecting transmits a portion of the wavelength-converted first or second part of the light to the second optical transmission fiber.

In any of the above embodiments, the first method may further include optically dropping to an array of optical receivers a portion of said light from a first optical transmission fiber such that the optically dropping transmits a portion of the wavelength-converted first or second part of the light to the array of optical receivers.

In any embodiments of the first method, the optically de-multiplexing may further include directing a portion of the light on each optical wavelength-channel of the sequence to a corresponding optical reflector. Each optical reflector of the sequence is controllable to redirect light received thereat to the optical outputs and is controllable to redirect light received thereat to optical wavelength-converters of a bank.

In some embodiments, a second method includes, in an optical wavelength-selective switch, optically multiplexing a plurality of optical data streams received at corresponding optical inputs of the optical wavelength-selective switch. The optically multiplexing includes wavelength-converting optical carriers carrying some of the optical data streams in optical wavelength-converters during a first period. The optically multiplexing includes wavelength-converting optical carriers carrying some of the received optical data streams in the optical wavelength-converters during a subsequent second period. At least, one of the optical wavelength-converters operates on the optical data streams received at different ones of the optical inputs in the first and second periods.

In some embodiments of the second method, at least two of the received optical data streams may be received at the optical wavelength-selective switch on optical wavelength-channels that overlap.

In some embodiments, the second method may further include dropping the optical data streams from one or more optical transmission fibers at a reconfigurable optical add/drop multiplexer.

In some embodiments, the second method may further include optically cross-connecting the optical data streams between two optical transmission fibers at a reconfigurable optical cross-connect.

DETAILED DESCRIPTION OF ILLUSTRATIVE EMBODIMENTS

Herein, various embodiments may be configured, e.g., to operate on and/or produce, e.g., optical data sequences on a disjoint sequence of optical wavelength-channels in any or all of the C, L and S bands.

Herein, various 1×N optical wavelength-selective switches (OWSSes) may provide optical wavelength-selective switching and/or optical wavelength-channel multiplexing with some optical wavelength-conversion of light on one or more wavelength-channels. The optical wavelength-conversion is performed via a bank of optical wavelength-converters that are shared by the N ports of one side of such a 1×N OWSS. Such sharing of optical wavelength-converters can provide some wavelength-conversion at a lower cost, i.e., when less than N optical wavelength-converters are used as a 1×N OWSS with N port-dedicated optical wavelength-converters. In some embodiments, such a 1×N OWSS may be used, e.g., to reduce or eliminate wavelength-channel conflicts between optical data streams that are to be optically cross-connected between optical transmission fibers, optically added to an optical transmission fiber, and/or optically dropped from an optical transmission fiber.

Figure 1:
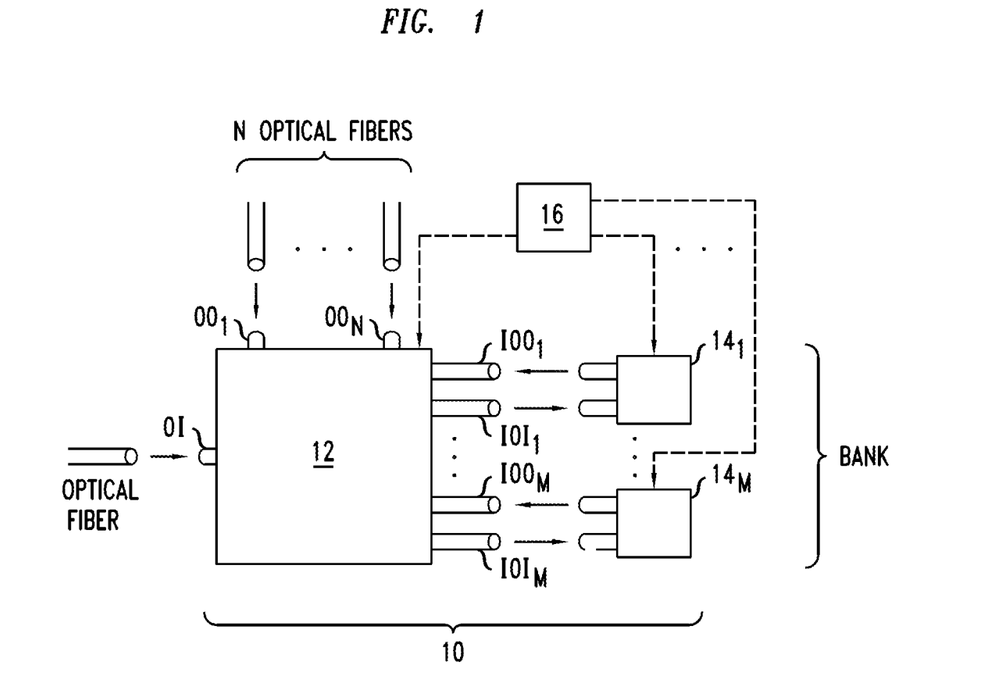
FIG. 1 is a block diagram schematically illustrating an embodiment of a 1×N optical wavelength-selective switch (OWSS) that supports some wavelength conversion.

FIG. 1 schematically illustrates a 1×N OWSS 10 that is capable of wavelength-converting up to a preselected number of the optical wavelength-channels of received light. The 1×N OWSS 10 includes a (1+M)×(N+M) reconfigurable wavelength-selective optical switch 12, a bank of M optical wavelength-converters $14_1$-$14_M$, and an electronic controller 16. The (1+M)×(N+M) reconfigurable wavelength-selective optical switch 12 has an optical port OI ((e.g., an optical coupler for the end of an optical fiber), N optical ports $OO_1$-$OO_N$ (e.g., optical couplers for the ends of N optical fibers), M intermediate optical ports $IOI_1$-$IOI_M$, and M intermediate optical ports $IOO_1$-$IOO_M$ (e.g., M paired sets of optical ports to the (1+M)×(N+M) switch 12, which may include collimating or focusing lenses or mirrors, aperture stops, optical waveguide segments, and combinations thereof).

In various embodiments, the 1×N OWSS 10 may be configured for forward operation and/or reverse operation. During forward operation, the 1×N OWSS 10 may function as an optical switch or an optical wavelength-channel de-multiplexer. In forward operation, the optical ports OI and $IOI_1$-$IOI_M$ function as optical inputs, and the optical ports $OO_1$-$OO_N$ and $IOO_1$-$IOO_M$ function as optical outputs. During reverse operation, the 1×N OWSS 10 may function as an optical wavelength-channel multiplexer. In reverse operation, the optical ports OI and $IOI_1$-$IOI_M$ function as optical outputs, and the optical ports $OO_1$-$OO_N$ and $IOO_1$-$IOO_M$ function as optical inputs.

In FIG. 1, the components 12, $14_1$-$14_M$, OI, $OO_1$-$OO_N$, $IOI_1$-$IOI_M$, and $IOO_1$-$IOO_M$ of the 1×N OWSS 10 are primarily described as components for forward operation of the 1×N OWSS 10. Based on the present disclosure, a person of ordinary skill in the relevant arts would readily understand how the components 12, $14_1$-$14_M$, OI, $OO_1$-$OO_N$, $IOI_1$-$IOI_M$, and $IOO_1$-$IOO_M$ would function during reverse operation of the 1×N OWSS 10.

During forward operation of the 1×N OWSS 10, the optical port OI functions as an optical input for receiving the light to be optically wavelength-selectively switched and/or to be optically wavelength-channel de-multiplexed. The optical port OI may function as an optical output for optically wavelength-channel multiplexed light during reverse operation of the 1×N OWSS 10.

During forward operation of the 1×N OWSS 10, the N optical ports $OO_1$-$OO_N$ function as N individual optical outputs to which light is routed based on wavelength. For example, such routing may be performing during optical wavelength-selective switching and/or optical wavelength-channel de-multiplexing.

In the 1×N OWSS 10, light on a set of some disjoint wavelength-channel(s) may be optically switched, multiplexed, or de-multiplexed with intermediate wavelength-conversion, and light on a separate set of disjoint wavelength-channel(s) may be optically switched, multiplexed, or de-multiplexed without wavelength conversion. During forward operation of the 1×N OWSS 10, such wavelength-conversion may be based, e.g., on the set of wavelength-channel(s) of light to be received at the optical port OI and/or the set of optical wavelength-channel(s) of light to be output via optical port(s) $OO_1$-$OO_N$. During reverse operation of the 1×N OWSS 10, such wavelength-conversion may be based, e.g., on the set of wavelength-channel(s) of light to be output via the optical port OI and/or the set of optical wavelength-channel(s) of light to be received at the optical port(s) $OO_1$-$OO_N$.

In the 1×N OWSS 10, the paired k-th intermediate optical ports $IOI_k$ and $IOO_k$ optically connect the k-th optical wavelength-converter $14_k$ to the (1+M)×(N+M) reconfigurable wavelength-selective optical switch 12. During forward operation of the 1×N OWSS 10, the k-th intermediate optical ports $IOI_k$ and $IOO_k$ connect to the respective optical input and optical output of the k-th optical wavelength-converter $14_k$. During reverse operation of the 1×N OWSS 10, the k-th intermediate optical ports $IOI_k$ and $IOO_k$ connect to the respective optical output and optical input of the k-th optical wavelength-converter $14_k$.

In the 1×N OWSS 10, each optical wavelength-converter $14_1$-$14_M$ of the bank is able to convert light of a received wavelength-channel to one of a set of final wavelength-channels. The bank may be used to wavelength-convert light of as many as M wavelength-channels of the light received at the first optical port OI or at the N second optical ports $OO_1$-$OO_N$ of the (1+M)×(N+M) wavelength-selective optical switch 12. The optical wavelength-converters $14_1$-$14_M$ are shared among the N optical ports $OO_1$-$OO_N$ thereby enabling a flexible deployment of wavelength-conversion rather than being assigned to preselected wavelength-channels in the light signal received at the optical port OI or being assigned to specific ones of the N optical ports $OO_1$-$OO_N$. In particular, the assignment of individual ones of the optical wavelength-converters $14_1$-$14_M$ to wavelength-channels of the light received an optical port OI or to individual ones of optical ports $OO_1$-$OO_N$ may be varied to enable a flexible deployment of wavelength conversion. For example, the bank may be configured to enable removal of up to M wavelength-channel conflicts in the optical N fiber channels directly connected to the N optical outputs of the 1×N OWSS 10. The banking of the optical wavelength-converters $14_1$-$14_M$ may enable flexible deployment of wavelength-conversion of some wavelength-channels without a need for a separate dedicated optical wavelength-converter for each of the N optical ports $OO_1$-$OO_N$ in the 1×N OWSS 10.

In the 1×N OWSS 10, the electronic controller 16 may be connected, e.g., as indicated by dashed lines, to control the M optical wavelength-converters $14_1$-$14_M$ and/or to control the (1+M)×(N+M) reconfigurable wavelength-selective optical switch 12. With respect to the M optical wavelength-converters $14_1$-$14_M$, the electronic controller 16 may control optical wavelength-channels of light produced by wavelength-conversion in the individual optical wavelength-converters $14_1$-$14_M$ of the bank. With respect to the (1+M)×(N+M) reconfigurable wavelength-selective optical switch 12, the electronic controller 16 may control the switch's internal routing map, i.e., for light on various optical-wavelength-channels, between the optical ports OI, $OO_1$-$OO_N$, $IOI_1$-$IOI_M$, and $IOO_1$-$IOO_M$.

Figure 2:
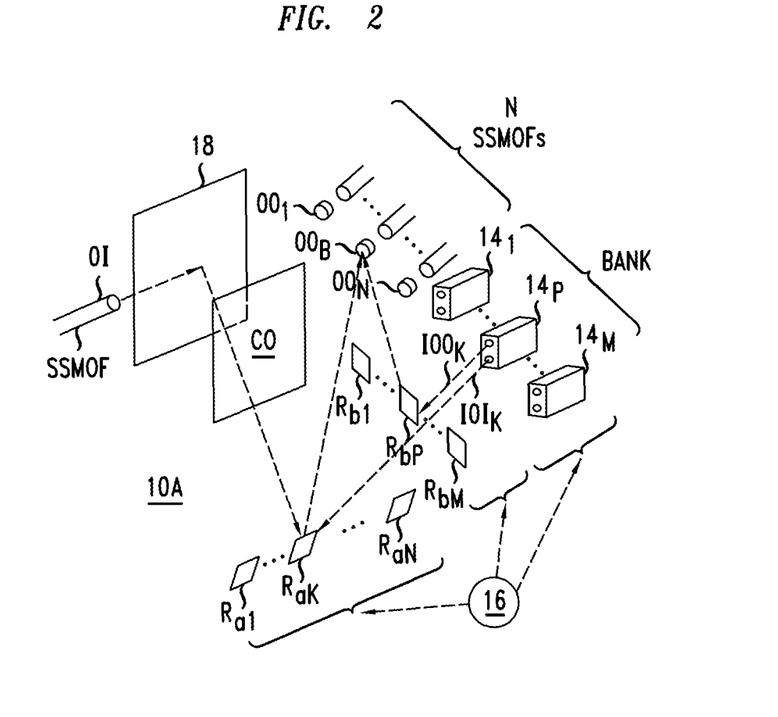
FIG. 2 illustrates a specific embodiment of the 1×N OWSS of FIG. 1 in which wavelength-selective switching is performed via a single-pass configuration.
Figure 3:
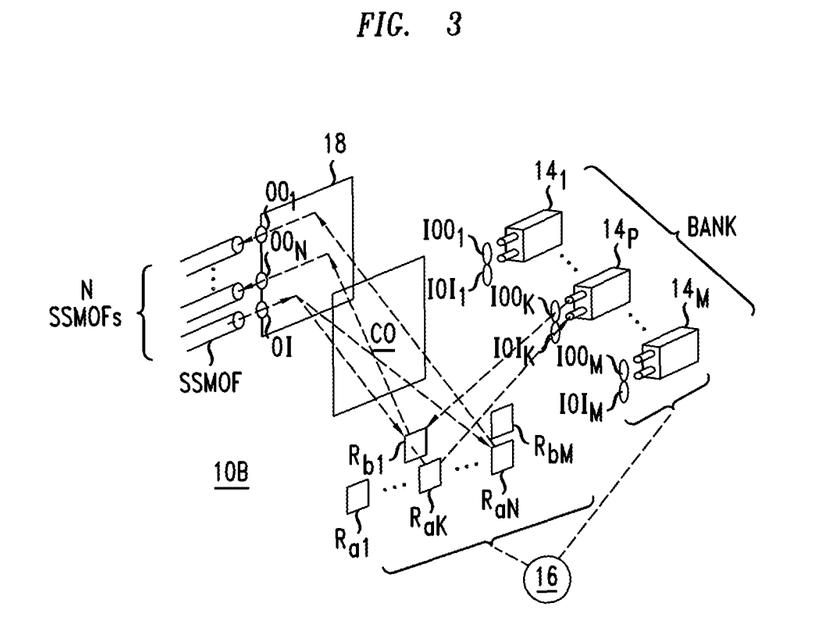
FIG. 3 illustrates a specific embodiment of the 1×N OWSS of FIG. 1 in which wavelength-selective switching is performed via a double-pass configuration.

FIGS. 2 and 3 illustrate free-space optical embodiments 10A, 10B for the OWSS 10 of FIG. 1.

FIG. 2 illustrates a first embodiment 10A of the 1×N OWSS 10 of FIG. 1. The 1×N OWSS 10A includes a local optical input OI and an array of N local optical outputs. The 1×N OWSS 10A also includes an optical wavelength separator 18, a first one-dimensional (1D) array of N re-orientable optical reflectors $R_{a1}, \ldots, R_{aN}$, a second 1D array of M re-orientable optical reflectors $R_{b1}, \ldots, R_{bM}$, a bank of M optical wavelength-converters $14_1$-$14_M$, an electronic controller 16, and optionally collimation optics CO.

The local optical input OI may include a local region or optical port for optically end-coupling to a standard single-mode optical fiber (SSMOF). The optical input OI may optionally include conventional collimation lens(es) or mirror(s) and/or an optical aperture (not shown) to collimate and/or limit a suitably directed light beam light to the near end of the SSMOF.

The array of N optical outputs $OO_1$-$OO_N$ may include N physically separated local regions or optical ports for optically end-coupling to a corresponding array of N SSMOFs. The optical input OI may optionally include conventional collimation lens(es) or mirror(s) and/or an optical aperture (not shown) to collimate and/or limit suitably directed light beams light to the near ends of the N SSMOFs.

The optical wavelength separator 18 angularly separates light based on wavelength and/or angularly multiplexes light based on wavelength. The optical wavelength separator 18 may include, e.g., a conventional reflection or transmission optical grating, which is capable of angularly dispersing an incident light beam based on wavelength-channel. During forward operation of the 1×N OWSS 10A, the optical wavelength separator 18 may redirect light of individual wavelength-channels to corresponding ones of the optical reflectors $R_{a1}, \ldots, R_{aN}$ of the first array. In reverse operation of the 1×N OWSS 10A, the optical wavelength separator 18 may combine light of individual wavelength-channels, which is received from corresponding ones of the optical reflectors $R_{a1}, \ldots, R_{aN}$ of the first array.

In the first array, each optical reflector $R_{a1}, \ldots, R_{aN}$ is configured to optically communicate light on a selected wavelength-channel with the optical port OI. During forward operation of the 1×N OWSS 10A, each optical reflector $R_{a1}, \ldots, R_{aN}$ is configured to receive light on a corresponding wavelength-channel from the optical port OI via the optical wavelength separator 18. During reverse operation of the 1×N OWSS 10A, each optical reflector $R_{a1}, \ldots, R_{aN}$ is configured to re-direct light of said wavelength-channel to the optical port OI via the optical wavelength separator 18. The optical reflector $R_{a1}, \ldots, R_{aN}$ may include, e.g., a re-orientable mirror or prism-reflector and a controllable mechanical element to set and adjust the orientation of the mirror or prism-reflector physically controlled thereby. The controllable mechanical element may be, e.g., conventional micro-electro-mechanical system (MEMS) actuator.

In the first array, each reflector $R_{a1}, \ldots, R_{aN}$ is able to redirect received light into a selected direction in a re-configurable manner, e.g., as illustrated for exemplary optical reflector $R_{aK}$ in FIG. 2. The individual optical reflectors $R_{a1}, \ldots, R_{aN}$ may be oriented to communicate light with selected ones of the optical ports $OO_1$-$OO_N$ of the 1×N OWSS 10A or alternately with selected ones of the optical input $IOI_1$-$IOI_M$ of the optical wavelength-converters $14_1$-$14_M$. For example, FIG. 2 illustrates that the K-th optical reflector $R_{aK}$ as being oriented to, e.g., redirect received light on the K-th wavelength-channel to the optical port $OO_B$ for outputting from the 1×N OWSS 10A. FIG. 2 also illustrates the same K-th optical reflector $R_a$ as alternately being oriented to redirect such received light to the P-th optical wavelength-converter $14_P$ for wavelength-conversion. In such a configuration, the P-th optical reflector $R_{bP}$ of the second array may be oriented to re-direct the optically wavelength-converted light from the P-th optical wavelength-converter $14_P$ to the B-th optical output $OO_B$ of the 1×N OWSS 10A. Thus, during forward operation of the 1×N OWSS 10A, some of the optical reflectors $R_{a1}, \ldots, R_{aN}$ can redirect received optical data streams directly to ones of the N optical outputs $OO_1$-$OO_N$ of the 1×N OWSS 10A and other(s) of the optical reflectors $R_{a1}, \ldots, R_{aN}$ can redirect received optical data streams the optical wavelength-converters $14_1$-$14_M$ prior to routing to the optical outputs $OO_1$-$OO_N$ of the 1×N OWSS 10A.

Optional collimating optics CO may be located between the optical wavelength separator 18 and the optical reflectors $R_{a1}, \ldots, R_{aN}$ of the first array. The optics CO may be configured to collimate light beams and thereby reduce optical losses for optical communications between the optical port OI and the optical reflectors $R_{a1}, \ldots, R_{aN}$ of the first array.

Each optical wavelength-converter $14_1$-$14_M$ of the bank is able to optically convert light, which is received at its optical input, to light at a new wavelength and to output said wavelength-converted light to its optical output. For example, an individual one of the optical wavelength-converters $14_1$-$14_M$ may be configurable to convert any wavelength-channel of the light signal received at the optical input OI of the 1×N OWSS 10A to any desired wavelength-channel of a preselected set. The individual optical wavelength-converters $14_1$-$14_M$ may be, e.g., conventional optical wavelength-converters that would be known to persons of ordinary skill in relevant arts.

In the second array, each controllable optical reflector $R_{b1}, \ldots, R_{bM}$ is located to optically communication from or to a corresponding one of the optical wavelength-converters $14_1$-$14_M$, e.g., as illustrated for the optical reflector $R_{bP}$ and the optical wavelength-converter $14_P$ in FIG. 2. During forward operation of the 1×N OWSS 10A, each controllable optical reflector $R_{b1}, \ldots, R_{bM}$ may receive light output by one of the optical wavelength-converters $14_1$-$14_M$ and to re-directs said received light towards a selected one of the N optical outputs $OO_1$-$OO_N$. During reverse operation of the 1×N OWSS 10A, each controllable optical reflector $R_{b1}, \ldots, R_{bM}$ may receive light from one of the N optical outputs $OO_1$-$OO_N$ and may re-direct such received light to the corresponding one of the optical wavelength-converters $14_1$-$14_M$.

The electronic controller 16 controls the N optical reflectors $R_{a1}, \ldots, R_{aN}$ of the first array, the M optical reflectors $R_{b1}, \ldots, R_{bM}$ of the second array, and the M optical wavelength-converters $14_1$-$14_M$. With respect to the first and second arrays, the electronic controller 16 can re-orient the various optical reflectors $R_{a1}, \ldots, R_{aN}$ and $R_{b1}, \ldots, R_{bM}$ to provide for desired wavelength-selective routing of light inside of the 1×N OWSS 10A and to enable optical wavelength-conversion of light on some wavelength-channels. With respect to the optical wavelength-converters $14_1$-$14_M$, the electronic controller 16 can operate said elements to produce a desired wavelength-conversion scheme of light on up to M selected wavelength-channels.

Whereas FIG. 2 illustrates the forward operation of the 1×N OWSS 10A, a person of ordinary skill in the relevant arts would readily understand reverse operation of the 1×N OWSS 10A based on the above description.

Whereas the 1×N OWSS 10A of FIG. 2 illustrates an embodiment in which one of the N optical reflectors $R_{a1}, \ldots, R_{aN}$ corresponds to each disjoint wavelength-channel of a sequence, in other embodiments a disjoint group of adjacent ones of the optical reflectors $R_{a1}, \ldots, R_{aN}$ may correspond to each such wavelength-channel.

FIG. 3 illustrates a second embodiment 10B of the 1×N OWSS 10 of FIG. 1. The 1×N OWSS 10B has an optical port OI and an array of N optical ports $OO1$-$OO_N$ as already described with respect to the 1×N OWSS 10A of FIG. 2. In addition, the 1×N OWSS 10B includes an optical wavelength separator 18, a first one-dimensional (1D) array of N controllable optical reflectors $R_{a1}, \ldots, R_{aN}$, a second 1D array of M controllable optical reflectors $R_{b1}, \ldots, R_{bM}$, a bank of M optical wavelength-converters $14_1$-$14_M$, an electronic controller 16, and optionally collimation optics CO as already described with respect to the 1×N OWSS 10A of FIG. 2.

The 1×N OWSS 10B of FIG. 3 operates in a double-pass configuration rather than in the single-pass configuration of the 1×N OWSS 10A of FIG. 2. During forward operation of the 1×N OWSS 10B, the optical wavelength separator 18 angularly separating light received from the optical port OI, based on wavelength, during the first pass. This first pass has already been described with respect to the 1×N OWSS 10A of FIG. 2. During forward operation of the 1×N OWSS 10B, the optical wavelength separator 18 receives light re-directed by the optical reflectors $R_{a1}, \ldots, R_{aN}$ and $R_{b1}, \ldots, R_{bM}$ of the first and second 1D arrays, during the second pass, and directs said light to individual ones of the optical ports $OO_1$-$OO_N$ in a wavelength-selective manner.

For double-pass processing in the optical wavelength separator 18, the optical reflectors $R_{a1}, \ldots, R_{aN}$ and $R_{b1}, \ldots, R_{bM}$ may produce different angular deflections of light in the OWSS 10B of FIG. 3 than in the 1×N OWSS 10A of FIG. 2. In addition, double-pass processing may include processing light on some optically wavelength-converted channels in the optical wavelength separator 18. For these reasons, the electronic controller 16 may set the angular orientations of the optical reflectors $R_{a1}, \ldots, R_{aN}$ and $R_{b1}, \ldots, R_{bM}$ differently in the double-pass 1×N OWSS 10B of FIG. 3 than in the single-pass 1×N OWSS 10A of FIG. 2. Based on the present description, a person of ordinary skill in the relevant arts would understand how to appropriately control orientations of the optical reflectors $R_{a1}, \ldots, R_{aN}$ and $R_{b1}, \ldots, R_{bM}$ in the 1×N OWSS 10B of FIG. 3.

Some embodiments of the double-pass 1×N OWSS 10B of FIG. 3 may have a simpler construction, a more efficient operation, and/or a smaller footprint than some embodiments of the single-pass 1×N OWSS 10A of FIG. 2.

From the present disclosure, the person of ordinary skill in the relevant arts would understand how to make and use other embodiments of OWSSes that have banks of optical wavelength-converters, which are sharing among the optical wavelength-channels of received light and/or among a set of optical ports. Some embodiments of such OWSSes may include first and second arrays of controllable optical reflectors with different forms, sizes, numbers and/or physical layouts than in described embodiments. In some such embodiments, the first and second arrays may have same numbers of individual optical reflectors, and the M optical wavelength-converters may send wavelength-converted light to an optical reflector of the second array, which is located next to a corresponding optical reflector of the first array. For example, the second array may have the same form as the first array so that corresponding paired mirrors of the two arrays are physically adjacent to each other. In such embodiments, the optical wavelength-converters $14_1$-$14_M$ may also include re-orientable light re-directors that are capable of directing wavelength-converted light to appropriate optical reflectors of the second array.

While FIGS. 1-3 illustrate 1×N OWSSes 10, 10A, 10B, other embodiments are directed to Q×N OWSSes having a bank of shared optical wavelength-converters and having Q>1. In a Q×N OWSS of such embodiments, the single local optical input OI of FIGS. 1-3 is replaced by an array of Q local optical inputs. Such a Q×N OWSS may be obtained from either of 1×N OWSSes 10A, 10B of FIGS. 2-3 by replacing the single optical input OI with a linear array of Q optical inputs and by replacing the SSMOF end-coupled to the optical input OI with Q SSMOFs whose near ends are aligned to optically end-couple to corresponding ones of the Q local optical inputs of the linear array. In such embodiments, the first array of N controllable and re-orientable optical reflectors $R_{a1}, \ldots, R_{aN}$ of FIGS. 2-3 is replaced by Q similar linear arrays. Each of the Q linear arrays has N optical reflectors, which are similar to the optical reflectors $R_{a1}, \ldots, R_{aN}$ of FIGS. 2-3. The Q linear arrays may form a vertical stack of Q rows, wherein each row has N optical reflectors of one of the linear arrays. In each of the Q linear arrays, the optical reflectors are individually re-orientable, e.g., by the electronic controller 16, to re-direct light, which is received from the corresponding local optical input, to a selected optical output $OO_1$-$OO_N$ of FIGS. 2-3 or to a selected optical wavelength-converter $14_1$-$14_M$ of the bank. In each of the Q linear arrays, the individual optical reflectors re-direct light, which is received from the optical wavelength separator 18, towards the optical outputs $OO_1$-$OO_N$ and the optical wavelength-converters $14_1$-$14_M$ in a wavelength-channel-by-wavelength channel manner.

The above-described OWSSes, e.g., the 1×N OWSSes 10, 10A, 10B of FIGS. 1-3, may be used in various types of optical networking devices. Some examples of such optical networking devices are described below.

Figure 4:
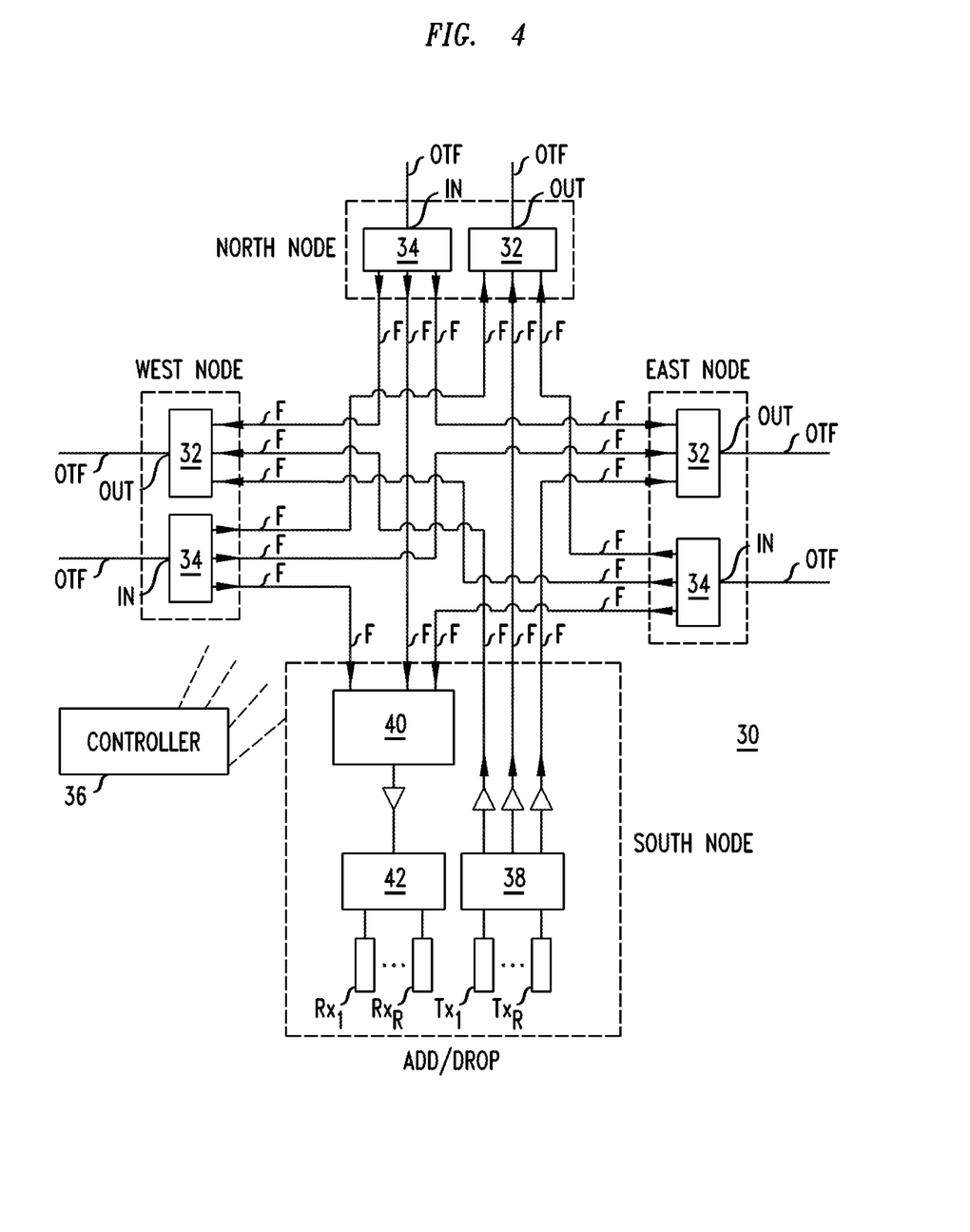
FIG. 4 is a block diagram schematically illustrates an optical routing device that includes one or more 1×N OWSSes according to FIG. 1.

FIG. 4 schematically illustrates an embodiment of an optical routing device 30 that may function as a reconfigurable optical add-drop multiplexer (ROADM) and/or a reconfigurable optical cross-connect (ROXC). The optical routing device 30 incorporates one or multiple of the 1×N OWSSes 10, 10A, 10B illustrated in FIGS. 1-3.

The optical routing device 30 has four nodes, which are indicated by dashed boxes in FIG. 4. For convenience, the four nodes are referred to herein as respective north, west, east, and south nodes, but the relative positions of these nodes may vary in different implementations of the optical routing device 30. Each of the north, west, and east nodes has an optical input (IN) optically coupled to an adjacent end of a first optical transmission fiber OTF of a pair and an optical output (OUT) optically coupled to adjacent end of a second optical transmission fiber OTF of the same pair. The first and second optical transmission fibers OTF of a pair are configured to support, as a unit, bi-directional optical communications with the node optically coupled and adjacent to the ends of the pair. But, other embodiments of the optical routing device 30 may optically end-connect single optical transmission fibers that support bi-directional optical communications. The south node has an array of R optical transmitters $Tx_1$-$Tx_R$, which supports the addition of optical wavelength-channel(s) to those carried by the optical transmission fibers OTF, and has an array of R' optical receivers $Rx_1$-$Rx_{R'}$, which supports the dropping of optical wavelength-channel(s) from those carried by the optical transmission fibers OTF.

The optical routing device 30 includes internal optical fiber bundles F, which are shown by lines with arrowheads in FIG. 4. Some of the internal optical fiber bundles F are optical cross-connects between the north, west, and east nodes. Others of the internal optical fiber bundles F provide optical add or drop connections between the north, west, and east nodes and the south node.

In the optical routing device 30, each of the north, west, and east nodes includes an OWSS 32 and an optical wavelength-selective de-multiplexer 34. The OWSS 32 and optical de-multiplexer 34 support optical cross-connections and optical adds and drops on the basis of individual optical wavelength-channels. That is, light on an individual optical wavelength-channel may be individually cross-connected to a different one of the optical transmission fibers OTF, dropped at the south node, or added to one of the optical transmission fibers OTF via the south node.

In each of the north, west, and east nodes, the OWSS 32 combines:
 (a) light signals of optical wavelength-channels received from internal optical fiber bundle(s) F that cross-connect(s) the same node to one or more others of the north, west, and east nodes and
 (b) light signals of optical wavelength-channels received from the internal optical fiber bundle F that connects the same node to the array of optical transmitters $Tx_1$-$Tx_R$ of the south node.

Each OWSS 32 transmits the resulting combination of optical wavelength-channels of light signals to the optical transmission fiber OTF directly optically end-coupled to and adjacent to the same node.

In some embodiments, one or more of the OWSSes 32 may be of the OWSS(es) 10, 10A, 10B as illustrated in FIGS. 1-4, i.e., in a configuration for reverse operation. In such embodiments, the OWSS(es) 32 may perform one or more optical wavelength-channel conversions, e.g., to remove optical wavelength-channel conflicts between the different optical signal streams of optical wavelength-channels being combined thereat. For example, such an optical wavelength-channel conflict typically occurs if two optical fibers of the internal optical fiber bundle(s) F carry optical signal streams modulated onto the same optical wavelength-channel and connect to the same one of the OWSSes 32.

To control the handling of such optical wavelength-channel conflicts, the optical routing device 30 may have a central electronic controller 36 that tracks the identities of the optical wavelength-channels being cross-connected to and added at the north, west, and east nodes. The central electronic controller 36 may control the individual OWSSes 32 to perform appropriate optical wavelength-channel conversion(s) to remove such optical wavelength-channel conflicts. In such embodiments, the shared nature of the optical wavelength-converters in banks of the OWSSes 32 may provide adequate capabilities for optical wavelength-conversion to avoid such conflicts. But, the shared nature of such optical wavelength-converters may make such embodiments of the OWSSes 32 less costly than would be OWSSes having a separate optical wavelength-converter dedicated to each of its optical ports, which connect to the internal optical fiber cables F.

At the north, west, and east nodes, the OWSSes 32 may also perform one or more optical wavelength-conversion(s) to produce suitable assignments of optical wavelength-channels to the optical transmission fibers OTF. In particular, the set of received optical wavelength-channels at one or more of the OWSSes 32 may not be suitable for subsequent routing at a distant end of the one of the one of the optical transmission fibers OTF whose near end is optically coupled and adjacent thereto. For example, one of the OWSSes 32 may receive a set of optical wavelength-channels that varies in time even though the optical routing at a distant end of the optical transmission fiber OTF end-coupled and adjacent thereto may be time constant. To compensate for such undesired temporal variations in the received set(s) of optical wavelength-channels, the OWSSes 32 may be operated, e.g., by the central electronic controller 36, to wavelength-convert the light signals of some received optical wavelength-channels to produce wavelength-channel multiplexed optical light signals appropriate for transmission and subsequent routing via the optical transmission fibers OTF.

In each of the north, west, and east nodes, the optical de-multiplexer 34 separates the individual optical wavelength-channels of light received from an optical transmission fiber OTF whose end is adjacent to and optically connected to the input IN of the same node. The light signals of said separated optical wavelength-channels are directed by the optical de-multiplexer 34 of the same node to corresponding optical fibers of the internal optical fiber bundle(s) F terminating at the same node. In particular, the optical de-multiplexer 34 may direct the light signals of one or more such optical wavelength-channel(s) to the individual optical port(s) of a R'×1 OWSS 40 of the south node for dropping. Alternately, the optical de-multiplexer 34 may direct light signals of one or more such optical wavelength-channel(s) to one or more of the OWSS(es) 32 of other(s) of the north, west, and south nodes for cross-connecting to other optical transmission fiber(s) OTF.

In the optical routing device 30, the south node has an optical transmitting section and an optical receiving section.

In the optical transmitting section, the R optical transmitters $Tx_1$-$Tx_R$ individually connect to separate optical fibers of the internal optical fiber bundles, e.g., via a passive or active optical switching array 38. These optical fibers provide optical inter-connections for light signals of the optical wavelength-channel(s) being added to the optical transmission fiber(s) OTF via the OWSS(es) 32 of the north, west, and east nodes.

In the optical receiving section, the R' optical receivers $Rx_1$-$Rx_{R'}$ individually optically connect via an optical switch to corresponding optical wavelength-channels being dropped from the optical transmission fibers OTF via the north, west, and east nodes. The optical switch includes the R'×1 OWSS 40 and a 1×R' optical de-multiplexer 42 connected in a back-to-back configuration.

The OWSS 40 has R' optical inputs that separately connect to the optical de-multiplexers 34 of the north, west, and east nodes via the optical fibers of the internal optical fiber cables F. For this reason, each input port of the OWSS 40 receives the light signals of a corresponding optical wavelength-channel for dropped from one of the optical transmission fibers OTF. The configuration of the OWSS 40 is oriented for reversed operation so that the OWSS 40 produces an optical wavelength-channel multiplexed light signal, e.g., as previously described with respect to FIGS. 1-3.

The optical de-multiplexer 42 receives the optical wavelength-channel multiplexed light signal produced by the OWSS 40 and routes the light signal(s) of the individual optical wavelength-channel(s) therein to corresponding one(s) of the individual optical receivers $Rx_1$-$Rx_{R'}$. Each individual optical receiver $Rx_1$-$Rx_{R'}$ of a subset of the array or of the entire array is assigned to demodulate data streams from the single one of the optical wavelength-channel(s) assigned and optically coupled thereto.

The R'×1 OWSS 40 may wavelength-convert one or more optical wavelength-channels received at the R' optical inputs thereof, e.g., under the control of the central electronic controller 36. In particular, such optical wavelength-conversion may be controlled to remove wavelength-channel conflict(s) between the optical wavelength channels of light signals being dropped by the various optical transmission fibers OTF at the optical routing device 30. In the R'×1 OWSS 40, the optical wavelength-converters are shared among the R' optical inputs so that assignment of optical wavelength converters to the R' optical inputs of the R'×1 OWSS 40 may be varied as described with respect to FIGS. 1-3. For that reason, a number of such optical wavelength-channel conflicts at the R' optical inputs may be removed without a requirement of dedicating a separate optical wavelength-converter to each of the R' optical inputs. Thus, the R'×1 OWSS 40 may have a less costly construction than an R'×1 OWSS in which each of the R' optical inputs has a dedicated optical wavelength-converter.

In addition, optical wavelength-conversion in the OWSS 40 may also be controlled, via the electronic controller 36, to correct the dropped optical wavelength-channel set in a manner appropriate for routing the light signals of individual optical wavelength-channels therein to corresponding ones of optical receivers $Rx_1$-$Rx_{R'}$. In particular, the optical de-multiplexer 42 will typically be configured to route a preset optical wavelength-channel to each individual optical receiver $Rx_1$-$Rx_{R'}$. Unfortunately, some of the optical wavelength-channels being dropped from the optical transmission fibers OTF may not belong to the set of preset optical wavelength-channels. To compensate for such mismatch(es), the OWSS 40 may be operated, e.g., by the central electronic controller 36, to optically wavelength-convert one or more of the dropped optical wavelength-channels in a manner that produces a multiplexed optical light signal whose individual optical wavelength-channels belong to said set. Then, the multiplexed optical light signal can be suitably de-multiplexed by the optical de-multiplexer 42 so that the light signals of each optical wavelength-channel therein is directed to a corresponding one of the R' individual optical receivers $Rx_1$-$Rx_{R'}$. To perform a number of such routing-related optical wavelength-conversions, the R'×1 OWSS 40 may have a bank of shared optical wavelength-converters and thus, may be less costly than an alternate R'×1 OWSS in which each of the R' optical inputs has a separate dedicated optical wavelength-converter.

In alternates to the optical routing device 30, the 1×N optical de-multiplexers 34 of FIG. 4 and/or the optical switching array 38 of FIG. 4 may be replaced with OWSSes with banks of shared optical wavelength converters, e.g., as shown in FIGS. 1-3 and above-described modifications thereto. In such embodiments, the 1×N OWSSes 32 and/or 40 of FIG. 4 can also be replaced by conventional N×1 optical multiplexers. In such embodiments, each OWSS, which replaces one of the optical de-multiplexers 34 or the optical switching array 38, may use a bank of shared optical wavelength-converters to reduce or remove wavelength-channel conflicts and/or to produce optically de-multiplexed light signals having appropriate wavelength-channel content.

In alternate embodiments, the optical routing device 30 of FIG. 4 may have a global bank of optical wavelength-converters, which is shared by two or more of the 1×N OWSSes 32 and 40. In some such embodiments, the 1×N OWSSes 32 and 40 may even not have dedicated optical wavelength-converters of their own, and the optical wavelength-converters of the global bank may be shared by all of the 1×N OWSSes 32, 40. The sharing of a bank of optical wavelength-converters by two or more of the 1×N OWSSes can still enable the removal of some optical wavelength-channel conflicts and/or some modification of the used optical wavelength-channel spectra while enabling an added reduction in the number of optical wavelength-converters in the optical routing device 30.

Figure 5:
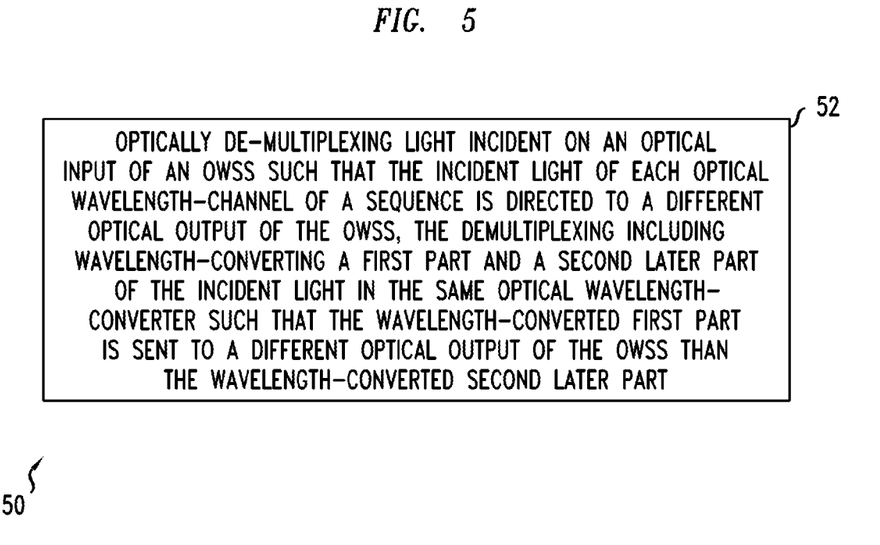
FIG. 5 is a flow chart that schematically illustrates a first method for performing optical de-multiplexing in an OWSS that performs some optical wavelength-conversion, e.g., as in the 1×N OWSSes of FIGS. 1-3 and 4.

FIG. 5 illustrates a method 50 for doing optical de-multiplexing in an OWSS that performs some optical wavelength-conversion. The method 50 may be performed in a 1×N OWSS having a bank of optical wavelength-converters, which are shared by the N optical outputs or N optical wavelength-channels to be optically de-multiplexed. The method 50 may, e.g., involve forward operating the OWSSes 10, 10A, 10B of FIGS. 1-3.

The method 50 includes optically de-multiplexing light incident on an optical input of an OWSS such that the incident light of each optical wavelength-channel of a sequence of non-overlapping optical wavelength-channels is directed to a different individual one of the optical outputs of the OWSS (step 52). In the 1×N OWSSes 10A, 10B of FIGS. 2-3, the optical wavelength separator 18 angularly de-multiplexes light incident on the optical input OI, and the incident light on various wavelength-channels is re-directed to the N optical ports $OO_1$-$OO_N$, based on received wavelength-channel, via the N controllable optical reflectors $R_{a1}$-$R_{aN}$ of the first array.

In the method 50, the optically de-multiplexing step 52 includes a sub-step of optically wavelength-converting, in an optical wavelength-converter, a first part of the incident light of one of the optical wavelength-channels and re-directing the wavelength-converted first part to a first of the optical outputs. In the 1×N OWSSes 10A, 10B of FIGS. 2-3, one of the optical wavelength-converters $14_1$-$14_M$ does this wavelength-converting, and the corresponding one of the optical reflectors $R_{b1}$-$R_{bM}$ of the second array performs this re-directing.

In the method 50, the optically de-multiplexing step 52 includes, in the same optical wavelength-converter, subsequently performing another sub-step of optically wavelength-converting a second later part of the incident light of a different one of the wavelength-channels and redirecting the wavelength-converted second part to a different second of the optical outputs of the OWSS. In the 1×N OWSSes 10A, 10B of FIGS. 2-3, the same one of the optical wavelength-converters $14_1$-$14_M$ may do this subsequent sub-step of optically wavelength-converting, and the corresponding one of the optical reflectors $R_{b1}$-$R_{bM}$ of the second array performs the re-directing of this subsequent sub-step.

In some embodiments, the method 50 may also include optically cross-connecting a portion of said light between first and second optical transmission fibers such that the cross-connecting transmits a portion of the wavelength-converted first or second part of the light to the second optical transmission fiber. Such optical cross-connecting may be performed, e.g., in alternates to the optical routing device 30 of FIG. 4 in which one or more of the optical de-multiplexers 34 is replaced by an OWSS having a bank of shared optical wavelength-converters.

In some embodiments, the method 50 may also include optically dropping to an array of optical receivers a portion of said light from a first optical transmission fiber such that the optically dropping transmits a portion of the wavelength-converting a first or second part of the light to the array of optical receivers. Such optical dropping may be performed, e.g., in alternates to the optical routing device 30 of FIG. 4 in which one or more of the optical de-multiplexers 34 is replaced by an OWSS having a bank of shared optical wavelength-converters.

Figure 6:
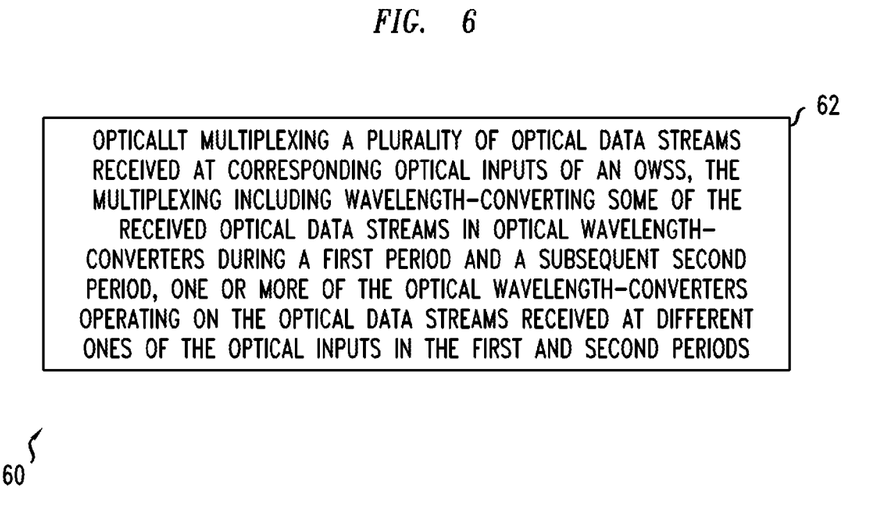
FIG. 6 is a flow chart that schematically illustrates a second method for performing optical multiplexing in an OWSS that performs some optical wavelength-conversion, e.g., as in the 1×N OWSSes of FIGS. 1-3 and 4.

FIG. 6 illustrates a method 60 for performing optical multiplexing in an OWSS that performs some optical wavelength-conversion. The method 60 may be performed in a Q×N OWSS having a bank of optical wavelength-converters shared by the N optical inputs or the N optical wavelength-channels to be optically de-multiplexed. The method 60 may involve, e.g., reverse operating the 1×N OWSSes 10, 10A, 10B of FIGS. 1-3 and/or operating the 1×N OWSS(es) 32 and/or the OWSS 40 of FIG. 4.

The method 60 includes optically multiplexing a plurality of optical data streams received at corresponding optical inputs of the OWSS (step 62). In the 1×N OWSSes 10A, 10B of FIGS. 2-3, the optical wavelength separator 18 may optically multiplex optical data streams received at the N optical ports $OO_1$-$OO_N$, when the 1×N OWSSes 10A, 10B are reverse operated.

In the method 60, the optically multiplexing step 62 includes a sub-step of optically wavelength-converting optical carriers carrying some of the optical data streams in optical wavelength-converters during a first period and a subsequent second period. At least, one of the optical wavelength-converters operates on the optical data streams received at different ones of the optical inputs in the first and second periods. In the 1×N OWSSes 10, 10A, 10B of FIGS. 1-3, any one of the "shared" optical wavelength-converters $14_1$-$14_M$ of the bank may perform such optical wavelength-converting in first and second successive periods of time.

In the method 60, two or more of the received optical data streams received at the optical inputs of the OWSS may be carried on optical wavelength-channels that overlap in wavelength. For example, multiple data streams may be carried by optical carriers in about the same optical wavelength-channel.

In some embodiments, the method 60 may include dropping some of the optical data streams from one or more optical transmission fibers at a reconfigurable optical add/drop multiplexer.

In some embodiments, the method 60 may include optically cross-connecting some of the optical data streams between two optical transmission fibers at a reconfigurable optical cross-connect.

The Detailed Description of the Illustrative Embodiments and drawings merely illustrate embodiments of the inventions. It will be appreciated that based on the present disclosure, persons of ordinary skill in the relevant arts will be able to readily devise other apparatus and method that, although not explicitly described or shown herein, are included within the claimed inventions. Furthermore, all examples recited herein are principally intended to be only for pedagogical purposes and are to be construed as being without limitation to claimed inventions. Moreover, all statements herein reciting principles, aspects, and embodiments are intended to encompass equivalents thereof.

Herein, a recitation that an element has feature B or feature C is satisfied if any of below cases 1, 2, and 3 are true. In case 1, the element has feature B, but does not have feature C. In case 2, the element has feature C, but does not have feature B. In case 3, the element has both feature B and C.

What is claimed is:
1. An apparatus, comprising:
a wavelength-selective optical switch able to wavelength-selectively route light between a first optical port and a plurality of second optical ports and intermediate optical ports; and
a bank of optical wavelength-converters, each of the optical wavelength-converters of the bank being connected to a corresponding one of the intermediate optical ports; and
wherein each of the optical wavelength-converters of the bank is able to selectively optically couple an optical data stream on a wavelength-channel between the corresponding one of the intermediate optical ports and individual ones of the second optical ports.

2. An apparatus, comprising:
a wavelength-selective optical switch able to route light between a first optical port and a plurality of second optical ports; and
wherein the wavelength-selective optical switch includes a bank of optical wavelength-converters; and
wherein each optical wavelength-converter of the bank is able to selectively optically couple an optical data stream on a wavelength-channel between the first optical port and individual ones of the second optical ports; and
wherein the wavelength-selective optical switch further comprises:
an optical wavelength separator configured to separate light received at the first optical port based on wavelength; and
an array of optical reflectors, each optical reflector of the array being controllable to selectively redirect light received from the optical wavelength separator to individual ones of the second optical ports and being controllable to selectively redirect light received thereat from the optical separator to individual ones of the optical wavelength-converters.

3. The apparatus of claim 2, wherein each optical reflector of the array is controllable to redirect light received thereat to different ones of the optical wavelength-converters.

4. The apparatus of claim 2, wherein the wavelength-selective optical switch comprises a second array of optical reflectors, each optical reflector of the second array being able to redirect light between one of the optical wavelength-converters and individual ones of the second optical ports.

5. The apparatus of claim 4, wherein each optical reflector of the second array is controllable to redirect wavelength-converted light from one of the optical wavelength-converters to a plurality of the second optical ports.

6. The apparatus of claim 1, further comprising:
a reconfigurable optical add/drop multiplexer including the optical wavelength-selective switch.

7. The apparatus of claim 6, wherein the optical wavelength-selective switch is controllable to wavelength-convert light of some of the wavelength-channels that the reconfigurable optical add/drop multiplexer is able to drop from an optical transmission fiber optically connected thereto.

8. The apparatus of claim 6, wherein the optical wavelength-selective switch is controllable to wavelength-convert light of some of the wavelength-channels that the reconfigurable optical add/drop multiplexer is able to add to an optical transmission fiber optically connected thereto.

9. An apparatus, comprising:
a wavelength-selective optical switch able to route light between a first optical port and a plurality of second optical ports; and
wherein the wavelength-selective optical switch includes a bank of optical wavelength-converters;
wherein each of the optical wavelength-converters of the bank is able to selectively optically couple an optical data stream on a wavelength-channel between the first optical port and individual ones of the second optical ports; and
wherein the apparatus further comprises:
a reconfigurable optical cross-connect for optically connecting multiple optical transmission fibers, the reconfigurable optical cross-connect including the optical wavelength-selective switch and being controllable to wavelength-convert some wavelength-channels that the reconfigurable optical cross-connect is able to optically cross-connect between the optical transmission fibers.

10. The apparatus of claim 9, comprising a reconfigurable optical add/drop multiplexer including a second optical wavelength-selective switch, the second optical wavelength-selective switch being controllable to wavelength-convert light of some of the wavelength-channels that the reconfigurable optical add/drop multiplexer is able to add to or drop from one of the optical transmission fibers.

11. A method, comprising:
optically de-multiplexing light incident on an optical input of an optical wavelength-selective switch such that the incident light of each optical wavelength-channel of a sequence of non-overlapping optical wavelength channels is directed to a different optical output of the optical wavelength-selective switch; and
wherein the optically de-multiplexing comprises:
in an optical wavelength-converter, wavelength-converting a first part of the incident light on one of the optical wavelength-channels and redirecting the wavelength-converted first part to a first of the optical outputs and
in the same optical wavelength-converter, subsequently wavelength-converting a second later part of the incident light on a different second of the optical wavelength-channels and redirecting the wavelength-converted second later part to a different one of the optical outputs.

12. The method of claim 11, wherein the optically de-multiplexing comprises:
in a different second optical wavelength-converter, wavelength-converting a part of the light on the one of the optical wavelength-channels and redirecting the wavelength-converted second part to one of the optical outputs.

13. The method of claim 11, further comprising optically cross-connecting a portion of said light from a first optical transmission fiber to a second optical transmission fiber such that the cross-connecting transmits a portion of the wavelength-converted first or second part of the light to the second optical transmission fiber.

14. The method of claim 11, further comprising optically dropping to an array of optical receivers a portion of said light from a first optical transmission fiber such that the optically dropping transmits a portion of the wavelength-converted first or second part of the light to the array of optical receivers.

15. The method of claim 11, wherein the optically de-multiplexing further comprises directing a portion of the light on each optical wavelength-channel of the sequence to a corresponding optical reflector, the optical reflector being controllable to redirect light received thereat to the optical outputs and being controllable to redirect light received thereat to optical wavelength-converters of a bank.

16. A method, comprising:
in an optical wavelength-selective switch, optically multiplexing a plurality of optical data streams received at corresponding optical inputs of the optical wavelength-selective switch; and
wherein the optically multiplexing includes wavelength-converting optical carriers carrying some of the received optical data streams in optical wavelength-converters during a first period; and
wherein the optically multiplexing includes wavelength-converting optical carriers carrying some of the received optical data streams in the optical wavelength-converters during a subsequent second period such that at least, one of the optical wavelength-converters operates on the optical data streams received at different ones of the optical inputs in the first and second periods.

17. The method of claim 16, wherein at least two of the received optical data streams are received at the optical wavelength-selective switch on optical wavelength-channels that overlap.

18. The method of claim 16, further comprising dropping the optical data streams from one or more optical transmission fibers at a reconfigurable optical add/drop multiplexer.

19. The method of claim 16, further comprising optically cross-connecting the optical data streams between two optical transmission fibers at a reconfigurable optical cross-connect.

* * * * *